US008995121B2

(12) United States Patent
Yen

(10) Patent No.: US 8,995,121 B2
(45) Date of Patent: Mar. 31, 2015

(54) DOCKING STATION FOR ELECTRONIC APPARATUS AND CONNECTOR MECHANISM THEREFOR

(75) Inventor: Chia-Lian Yen, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 213 days.

(21) Appl. No.: 13/598,626

(22) Filed: Aug. 30, 2012

(65) Prior Publication Data

US 2013/0170131 A1    Jul. 4, 2013

(30) Foreign Application Priority Data

Dec. 28, 2011    (TW) .............................. 100149201 A

(51) Int. Cl.
*H05K 7/00*    (2006.01)
*G06F 1/16*    (2006.01)
(52) U.S. Cl.
CPC ............ *G06F 1/1632* (2013.01); *G06F 1/1626* (2013.01)
USPC ................ 361/679.44; 361/679.2; 361/679.3; 361/679.55; 361/679.56; 361/725
(58) Field of Classification Search
CPC ..... G06F 1/632; G06F 1/1616; G06F 1/1626; G06F 1/1613; G06F 1/203; G06F 1/1624; H04M 1/0247; H04M 1/022; H05K 5/0226; F16M 11/2057; H04N 2201/0058; B60R 2011/0075; B60R 2011/008
USPC ................. 361/679.2–679.3, 679.44, 679.55, 361/679.56, 725, 728, 755; 439/11, 13, 31, 439/57, 104, 142, 136
See application file for complete search history.

(56) References Cited

U.S. PATENT DOCUMENTS

| 6,716,058 | B2 * | 4/2004 | Youn .............................. 439/535 |
| 7,643,283 | B2 * | 1/2010 | Jubelirer et al. ......... 361/679.41 |
| 8,508,933 | B2 * | 8/2013 | Lee ........................... 361/679.44 |
| 8,634,188 | B2 * | 1/2014 | Haren et al. ............. 361/679.41 |
| 8,721,356 | B2 * | 5/2014 | Webb et al. .................... 439/248 |

(Continued)

FOREIGN PATENT DOCUMENTS

| TW | M396575 | 1/2011 |
| TW | 201129298 | 8/2011 |
| TW | 201146148 | 12/2011 |

OTHER PUBLICATIONS

Office action mailed on Jul. 25, 2014 for the Taiwan application No. 100149201, filing date: Dec. 28, 2011, p. 1 line 1~14, p. 2~9 and p. 10 line 1~21.

*Primary Examiner* — Robert J Hoffberg
*Assistant Examiner* — Hung Dang
(74) *Attorney, Agent, or Firm* — Winston Hsu; Scott Margo

(57) ABSTRACT

A docking station for electronic apparatus includes a base, a hinge, a support, and a connector mechanism. The support is pivotally connected to the base through the hinge. The connector mechanism includes an angle transmission mechanism and a connecting module. The angle transmission mechanism is disposed in the base and includes a transmission device and a rotation part. The transmission device connects a pivot of the hinge and the rotation part so that the pivot can drive the rotation part to rotate through the transmission device. The connecting module is fixed on the rotation part and includes a connector exposed out the base through a window of the base. When an electronic apparatus is electrically connected to the connector, the support supports the electronic apparatus. Therefore, a user can adjust the support and the connector simultaneously, which reduces the time for connecting the electronic apparatus onto the docking station.

23 Claims, 11 Drawing Sheets

(56) References Cited

U.S. PATENT DOCUMENTS

| | | |
|---|---|---|
| 2011/0292584 A1 | 12/2011 | Hung |
| 2013/0194742 A1 | 8/2013 | Hung |
| 2013/0201619 A1 | 8/2013 | Hung |
| 2013/0335915 A1 * | 12/2013 | Lai et al. .................. 361/679.44 |

* cited by examiner

DOCKING STATION FOR ELECTRONIC APPARATUS AND CONNECTOR MECHANISM THEREFOR

BACKGROUND OF THE INVENTION

1. Field of the Invention

The invention relates to a connector mechanism and a docking station, and especially relates to a docking station for electronic apparatus and a connector mechanism used in the docking station.

2. Description of the Prior Art

For requirements for light and thin electronic apparatus, common electronic apparatuses are designed to be without bulky devices or infrequently-used connection ports, such as optical disk drive, keyboard and conventional serial and parallel ports which are externally used. These devices are usually integrated into a docking station. For improving functionality of the docking station, the docking station usually also provides powering. When a user needs to use the above external devices, the user can engage the electronic apparatus with the docking station. At the moment, the electronic apparatus can use the function or device provided by the docking station. In general, the docking station only provides expansion connection, so the electronic apparatus only provides simple support for the electronic apparatus to be firmly electrically connected to the docking station. As for convenient operation on the electronic apparatus engaged with the docking station for users, it is not under the consideration yet.

As tablet PCs are increasingly popular, some docking stations have keyboard function and are capable of providing supporting the tablet PC in a proper angle for convenience of use for users. However, most of these docking stations only provide single supporting angle, which still cannot satisfy various demands by users and is still a little inconvenient. For example, the connector for these docking stations for electrically connecting with the tablet PC is usually disposed in a fixed angle, so the operation angle for the tablet PC engaged with the connector is limited. For another example, the connector for some docking stations is rotatable, so a rotatable support pivotally connected to the docking station is required for the connector installed thereon. However, because of the capability of free rotating of such connector, the engagement of the tablet PC with the docking station is relatively unstable if the tablet PC is not support properly. Especially when the angle for rotating the tablet PC backward is excessively large, the tablet PC may be disengaged from the connector of the docking station. Certainly, some docking stations are designed to be wireless linked with the tablet PC, so the docking station can support the tablet PC just by simple supporting structure. However, wireless transmission such as Bluetooth is limited to bandwidth or other transmission factors so that velocity, quality and quantity of the transmission is limited so as to be not so good as transmission over connectors physically contacted with each other. Therefore, improvement is necessary for conventional docking stations so as to really meet requirements for use by users.

SUMMARY OF THE INVENTION

An objective of the invention is to provide a connector mechanism used in a docking station for electronic apparatus, which uses an angle transmission mechanism to make a connector rotate as a support of the docking station rotates, so that a user can adjust the supporting angle of the support and the engagement direction of the connector simultaneously.

The connector mechanism of the invention is disposed in a docking station. The docking station includes a base, a hinge, and a support. The support is pivotally connected to the base through the hinge. The hinge includes a pivot. The support and the pivot rotate together. The support is capable of supporting an electronic apparatus electrically connected to the connector mechanism. The connector mechanism includes an angle transmission mechanism and a connecting module. The angle transmission mechanism is disposed in the base and includes a transmission device and a rotation part. The transmission device is connected to the pivot and the rotation part such that the pivot is capable of driving the rotation part to rotate through the transmission device. The connecting module is fixed on the rotation part and includes a connector. The connector is exposed out the base and capable of being electrically connected to the electronic apparatus. Thereby, when a user rotates the support, the rotation part is driven by the transmission device to rotate so that the engagement direction of the connector is adjusted. Therefore, it is unnecessary for the user to additionally adjust the engagement direction in coordination with the supporting angle of the support. The invention solves the problem of separate adjustments on the docking station in the prior art. Furthermore, the invention can provide various supporting angles to the electronic apparatus just by rotating the support.

Another objective of the invention is to provide a docking station for electronic apparatus, which having the connector mechanism of the invention. Therefore, the docking station can provide users the function of adjusting the supporting angle of the support and the engagement direction of the connector simultaneously.

The docking station of the invention includes a base, a hinge, a support, and a connector mechanism. The base has a window. The hinge includes a pivot. The support is pivotally connected to the base through the hinge and is capable of rotating together with the pivot. The connector mechanism includes an angle transmission mechanism and a connecting module. The angle transmission mechanism is disposed in the base and includes a transmission device and a rotation part. The transmission device is connected to the pivot and the rotation part such that the pivot is capable of driving the rotation part to rotate through the transmission device. The connecting module is fixed on the rotation part and includes a connector exposed out the base through the window. When an electronic apparatus is electrically connected to the connector, the support supports the electronic apparatus. Similarly, a user can obtain a simultaneous adjustment on the engagement direction of the connector by adjusting the supporting angle of the support, which simplifies the operation of connecting the electronic apparatus with the docking station by the user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
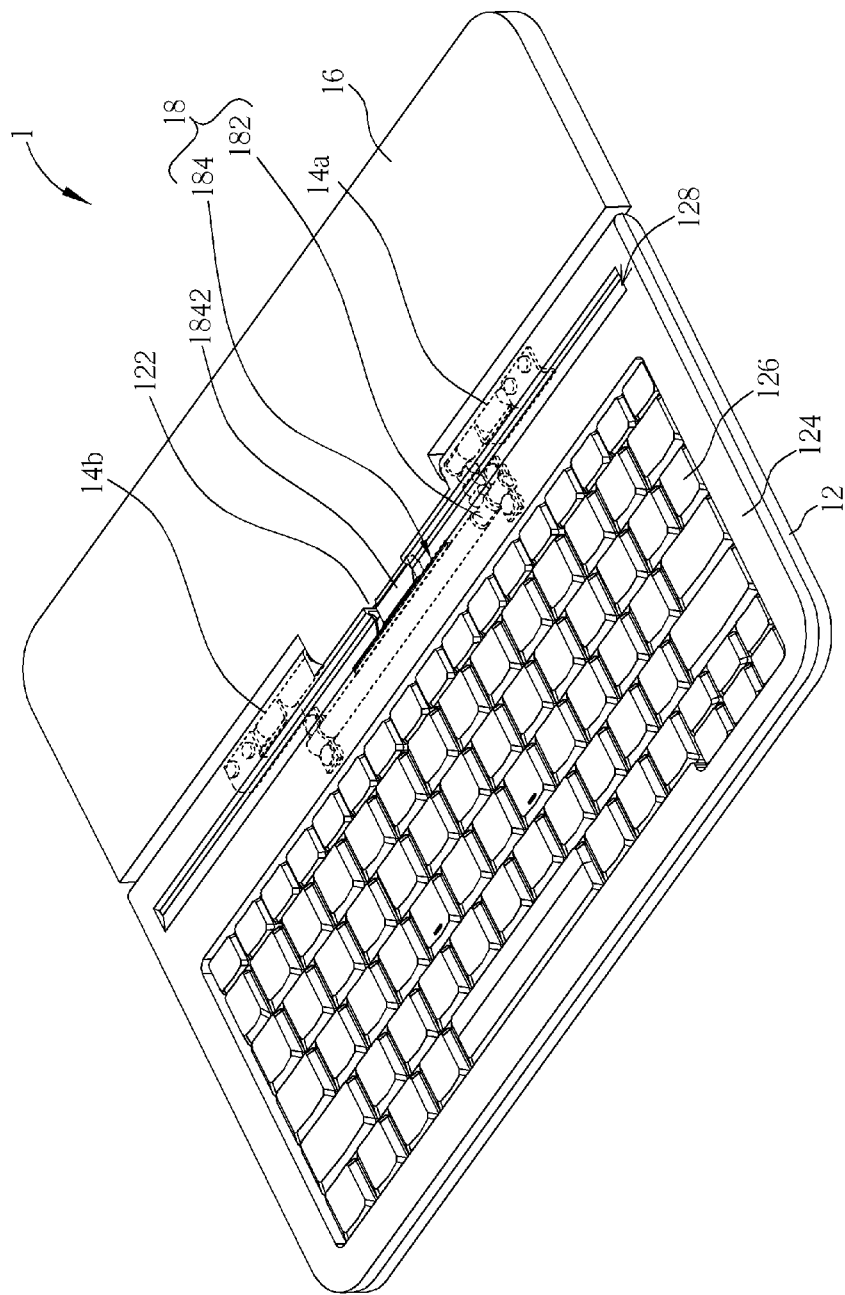
FIG. 1 is a schematic diagram illustrating a docking station for electronic apparatus of a preferred embodiment according to the invention.
Figure 2:
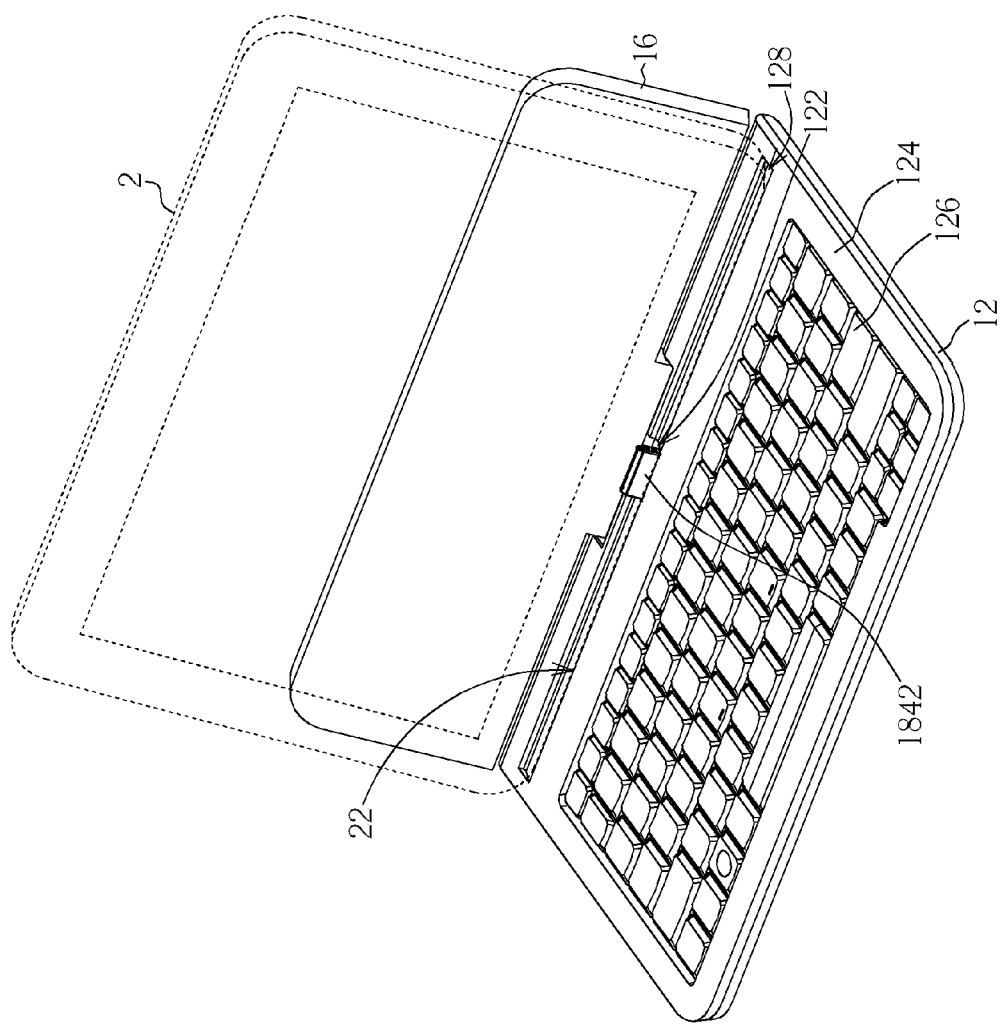
FIG. 2 is a schematic diagram illustrating the docking station in FIG. 1 at a use state.

Please refer to FIG. 1 and FIG. 2. FIG. 1 is a schematic diagram illustrating a docking station 1 for electronic apparatus of a preferred embodiment according to the invention. FIG. 2 is a schematic diagram illustrating the docking station 1 at a use state. Therein, an electronic apparatus 2 (such as a tablet PC, shown by dashed lines in FIG. 2) is engaged to and supported by the docking station 1. The docking station 1 includes a base 12, two hinges 14a and 14b (of which the hidden portion is shown by dashed lines in FIG. 1), a support 16, and a connector mechanism 18 (of which the hidden portion is shown by dashed lines in FIG. 1). The support 16 is pivotally connected to the base 12 through the hinges 14a and 14b. The connector mechanism 18 is disposed in the base 12 and includes an angle transmission mechanism 182 and a connecting module 184. The angle transmission mechanism 182 connecting the hinge 14a and the connecting module 184. when the support 16 rotates relative to the base 12 by the hinges 14a and 14b, the connecting module 184 also rotates simultaneously through the angle transmission mechanism 182 so that the engagement direction of the connector 1842 of the connecting module 184 can be adjusted in coordination with the supporting angle of the support 16. Thereby, the electronic apparatus 2 can be engaged directly to the connector 1842 and supported by the support 16.

Figure 3:
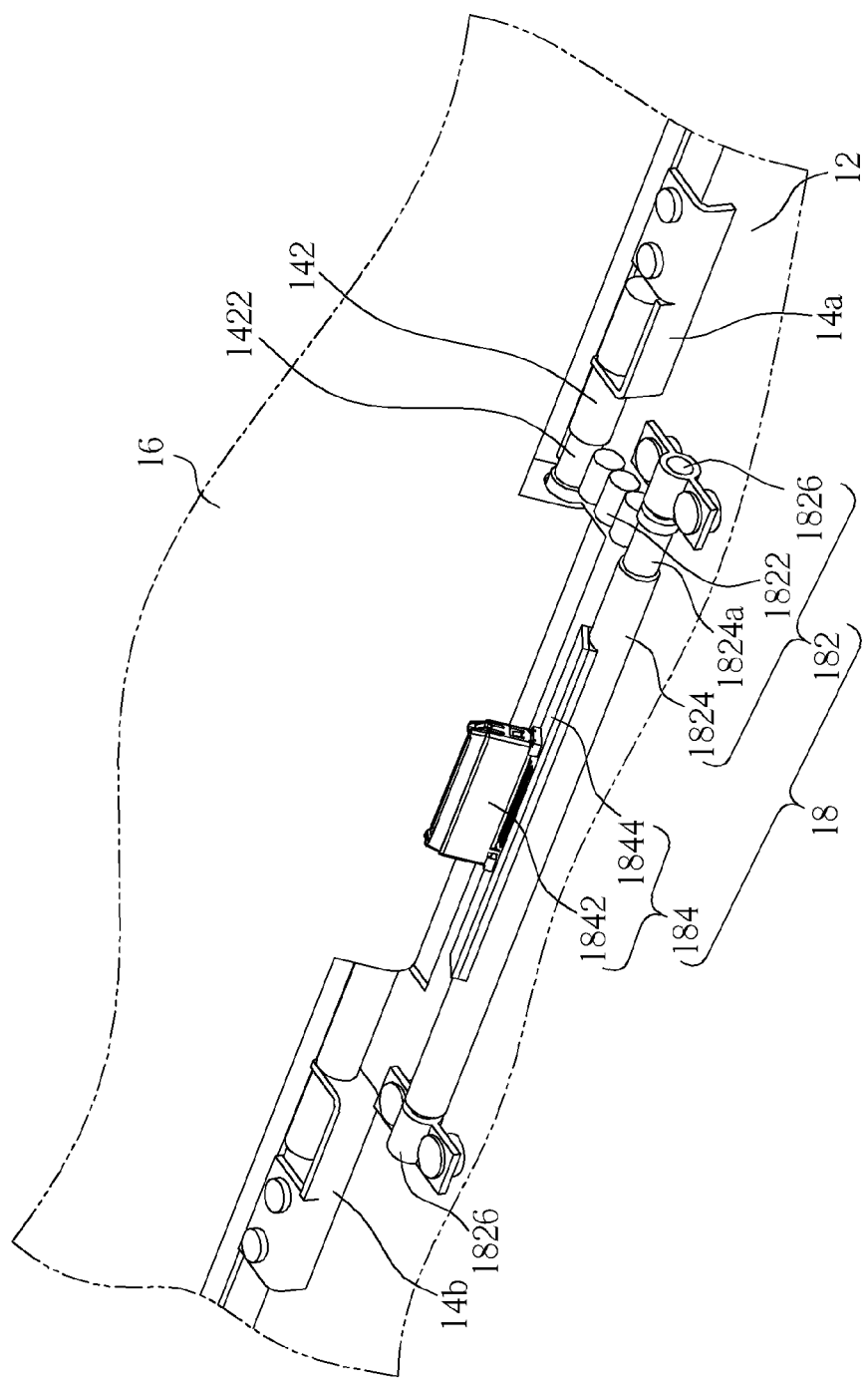
FIG. 3 is an enlarged view of the partial interior of the docking station in FIG. 2.

Please also refer to FIG. 3, which is an enlarged view of the partial interior of the docking station 1. The view point thereof is the same as FIG. 2. The hinge 14a includes a pivot 142. When the support 16 rotates, the pivot 142 and the support 16 rotate together. For example, an end portion of the pivot 142 is fixed on the support 16. The angle transmission mechanism 182 is disposed in the base 12 and includes a transmission device, a rotation part 1824, and two shaft supports 1826. In the embodiment, the transmission device is a gear set 1822 (the teeth profile thereof is not shown in FIG. 3 for simple drawing). The rotation part 1824 is a rotary shaft.

The shaft supports 1826 are fixed in the base 12 to bear two end portions of the rotary shaft. It is proper to also refer to FIG. 4 in the following. The pivot 142 includes a first gear portion 1422. The rotation part 1824 includes a second gear portion 1824a. The gear set 1822 meshes with the first gear portion 1422 and the second gear portion 1824a respectively, so as to achieve the purpose of the gear set 1822 connecting the pivot 142 and the rotation part 1824 and to make the pivot 142 be capable of driving the rotation part 1824 to rotate through the gear set 1822. The connecting module 184 includes a circuit board 1844 fixed on the rotation part 1824. The connector 1842 is fixed on the circuit board 1844. Thereby, the engagement direction of the connector 1842 can be adjusted as the pivot 142 rotates.

Figure 4:
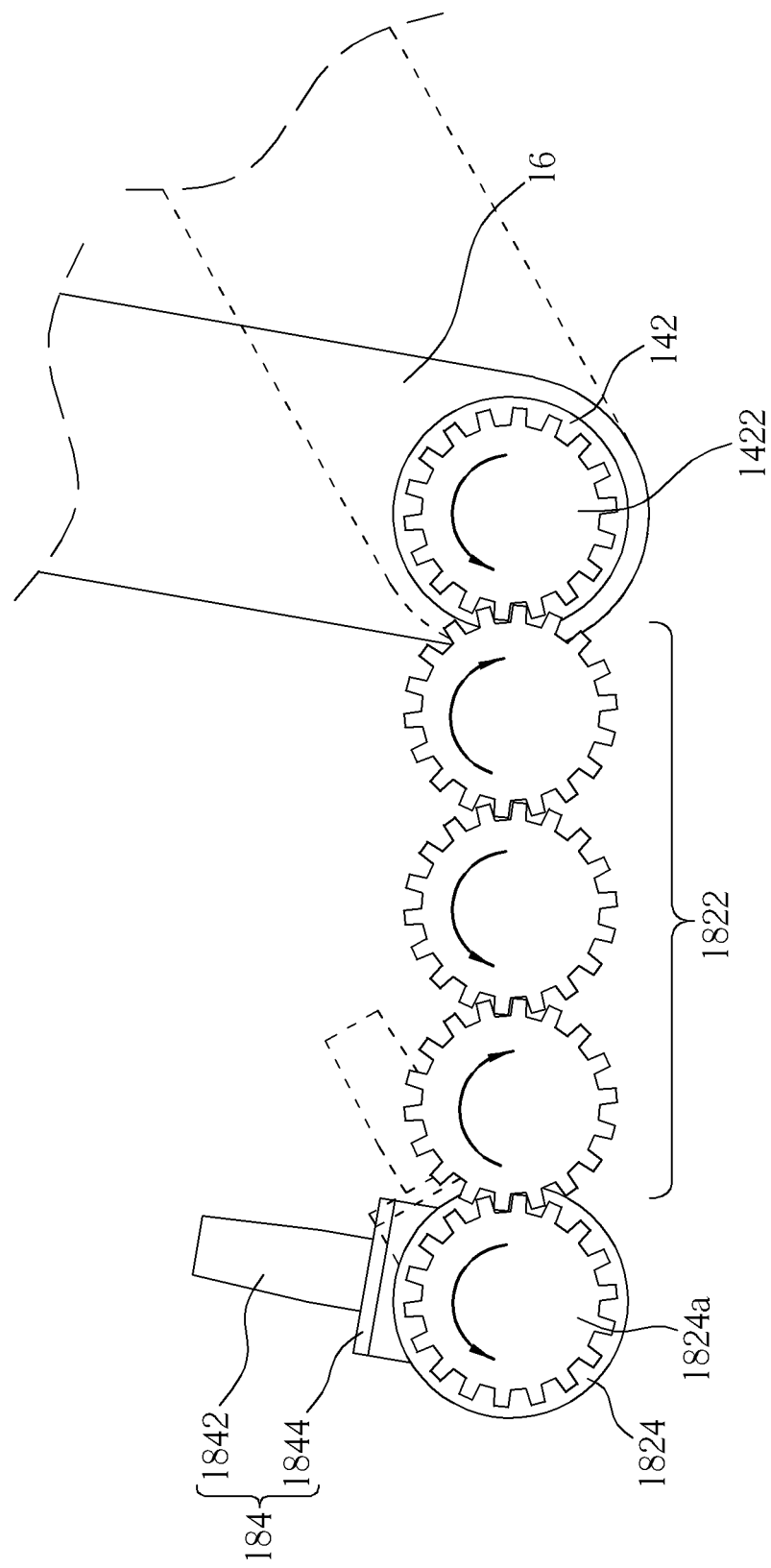
FIG. 4 is a schematic diagram illustrating the action mechanism of the support, the pivot, the angle transmission mechanism, and the connecting module of the docking station in FIG. 2.

Please refer to FIG. 4, which is a schematic diagram illustrating the action mechanism of the support 16, the pivot 142, the angle transmission mechanism 182, and the connecting module 184. The view point thereof is a side view. In the embodiment, the gear set 1822 consists mainly of odd gears such as three gears, so the rotation directions of the rotation part 1824 and the pivot 142 are the same. The rotation direction for each gear is shown by a bold line with arrow. If the radius of the first gear portion 1422 (i.e. the radius of the pitch circle thereof) is equal to the radius of the second gear portion 1824a, the rotated angle of the rotation part 1824 will be equal to the rotated angle of the pivot 142. The rotation of the connector 1842 and the support 16 is illustrated by dashed lines in FIG. 4. In other words, the pivot 142 and the rotation part 1824 are rotated simultaneously in a constant angular velocity. Therefore, the relative angle between the connector 1842 and the support 16 can be kept unchanged. For example, when the support 16 lies down, the connector 1842 is also disposed at a flat state and does not protrude out the base 12, as shown in FIG. 1. At this moment, the docking station 1 is suitable for being accommodated. When the support 16 rotates upward, the connector 1842 also rotates upward in the same angle and protrudes out the base 12 through the window 122 of the base 12. At this moment, the electronic apparatus 2 can be inserted onto the docking station 1 to be engaged with the connector 1842 and to be supported by the support 16, as shown in FIG. 2.

In the embodiment, the base 12 thereon defines a manipulation plane 124. The base 12 includes a manipulation input module 126 and a groove structure 128 on the manipulation plane 124. The window 122 is located at the groove structure 128. The connector 1842 is exposed out the groove structure 128 and the manipulation plane 124. When the electronic apparatus 2 is engaged with the connector 1842, the groove structure 128 contains an edge 22 of the electronic apparatus 2, as shown in FIG. 2. In the embodiment, the manipulation input module 126 is a keyboard, the keycaps of which are exposed out the manipulation plane 124 for users to operation. In practice, the manipulation input module 126 can be a touch pad or a combination of keyboard and touch pad; however, the invention is not limited thereto. After the electronic apparatus 2 is engaged with the connector 1842, a user can perform operation on the electronic apparatus 2 through the manipulation input module 126 under the engagement condition of the electronic apparatus 2 with the docking station 1.

It is added that in the embodiment, the tilt angles of the support 16 and the connector 1842 are the same. The parallel distant varies as the tilt angle varies. For example, when the docking station 1 is at an accommodated state, the parallel distant can be regarded as zero, which is improper for the electronic apparatus 2 to be inserted onto the docking station 1. In principle, the tilt angle of the electronic apparatus 2 inserted onto the docking station 1 is the same as the tilt angle of the connector 1842. In other words, the distance between the electronic apparatus 2 and the support 16 varies as the tilt angle of the connector 1842 varies, which properly leads to the electronic apparatus 2 being effectively supported by the support 16 only within a partial range of the tilt angle of the support 16 (or the connector 1842). If the engagement tolerance (including an allowable elastic structural deformation of the connector 1842) for the connector 1842 with the electronic apparatus 2 is under consideration, the partial tilt angle for effectively supporting can be extended. And if the connecting module 184 is fixed on the rotation part 1824 in a way of allowing little elastic deformation, for example a rubber pad or other elastic object disposed between the connecting module 184 and the rotation part 1824, the allowable engagement tolerance for the connector 1842 and the electronic apparatus 2 can be enlarged, and the tilt angle for effectively supporting can be extended more.

Figure 5:
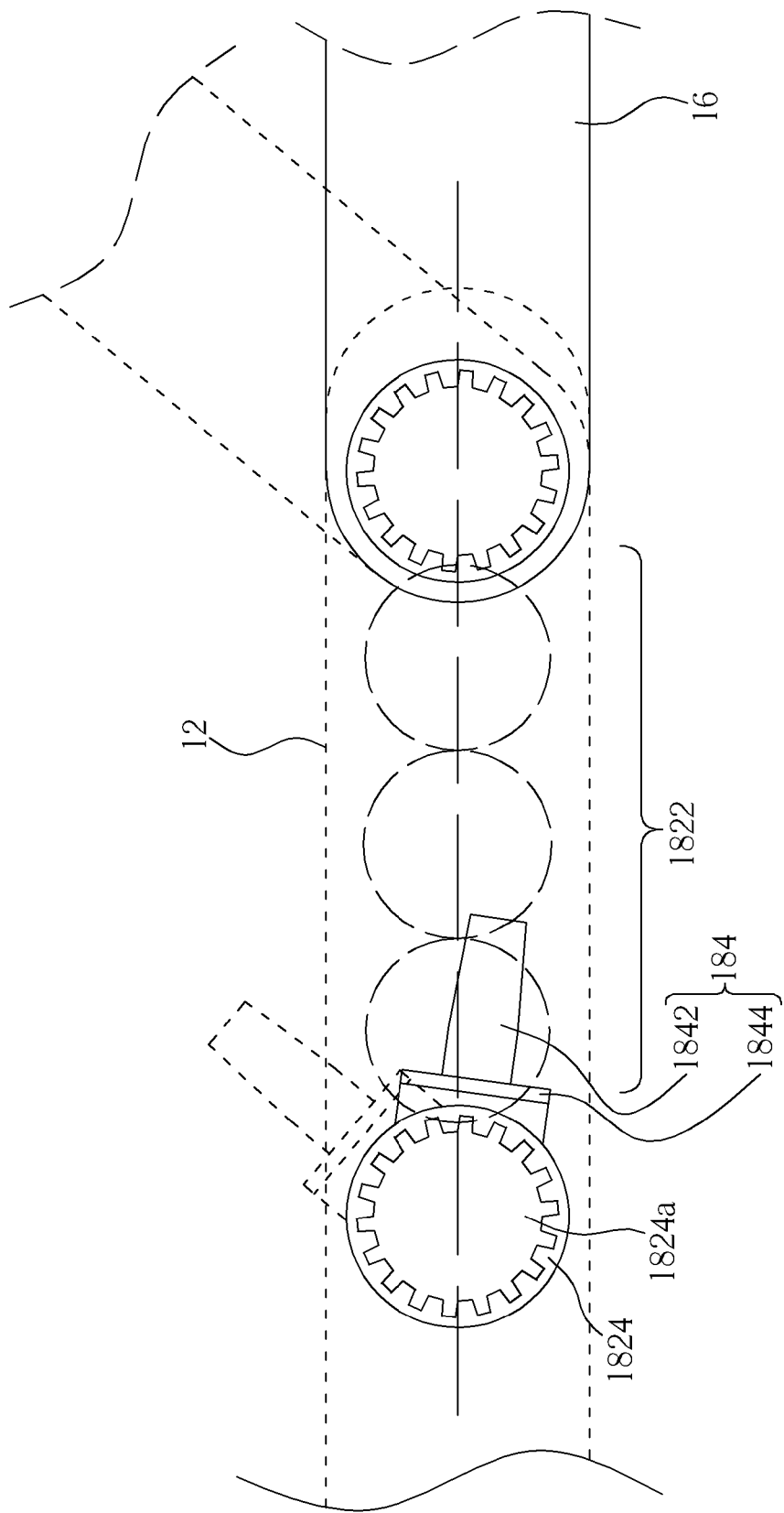
FIG. 5 is a schematic diagram illustrating the action mechanism of the connecting module and the support of the docking station according to another embodiment.

In addition, in the embodiment, the engagement direction of the connector 1842 is parallel to the support 16, but the invention is not limited thereto. Please refer FIG. 5, which is a schematic diagram illustrating the action mechanism of the connecting module 184 and the support 16 of the docking station according to another embodiment; therein, for simple illustration, the gear set 1822 is shown by circles of chain lines in the figure. In the embodiment, the engagement direction of the connector 1842 tilts toward, not parallel to the support 16. When the support 16 lies down, the connector 1842 sinks slightly relative to horizontal and still can be properly accommodated in the base 12 without protrusive portion out the base 12, which is shown by dashed lines in FIG. 5. When the support 16 rotates upward to a proper supporting angle, the connector 1842 also rotates upward such that it is suitable for the electronic apparatus 2 (shown by dashed lines in FIG. 5) to be inserted to the connector 1842 and supported by the support 16.

Figure 6:
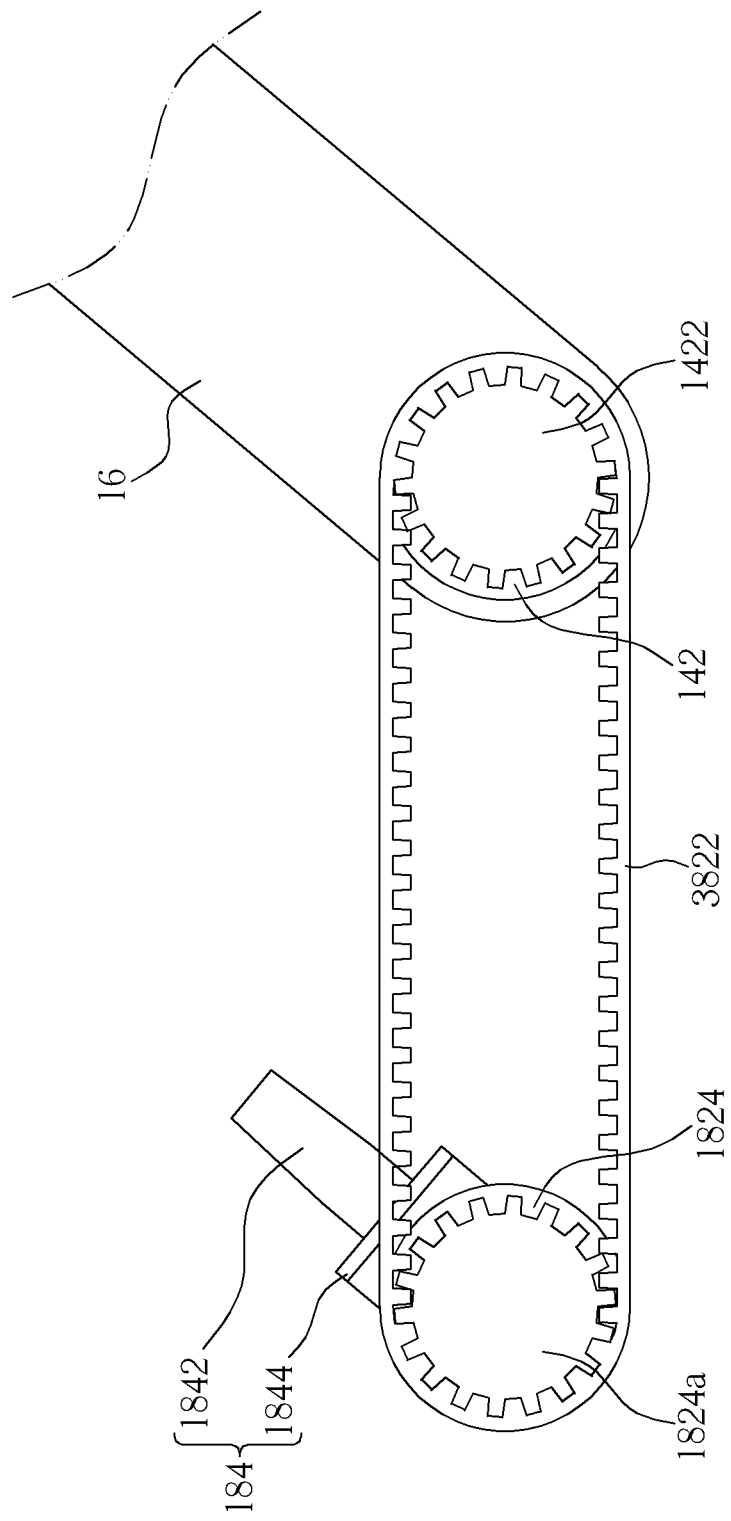
FIG. 6 is a schematic diagram illustrating the action mechanism of the support, the pivot, the belt gear, the rotation part, and the connecting module of the docking station according to another embodiment.
Figure 7:
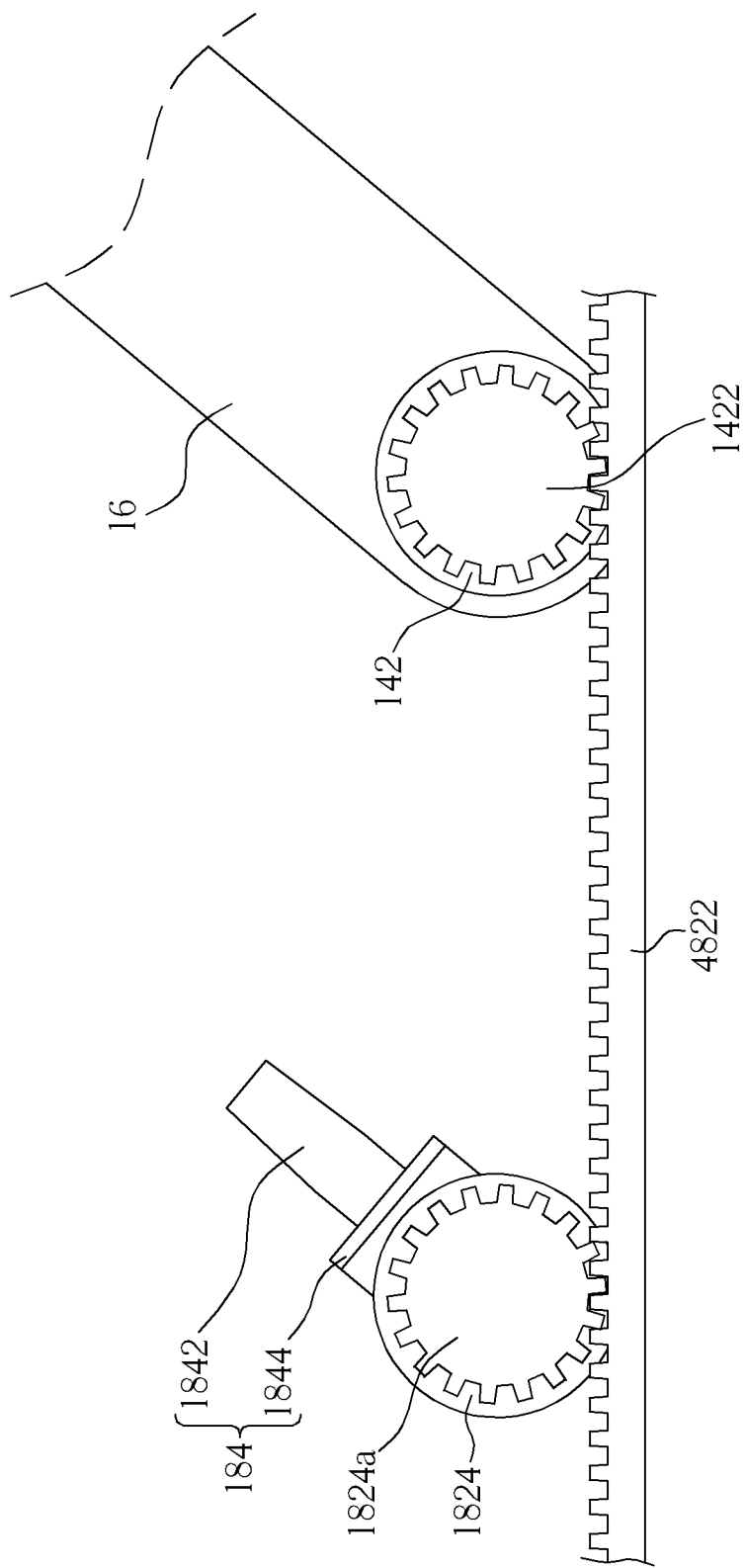
FIG. 7 is a schematic diagram illustrating the action mechanism of the support, the pivot, the rack, the rotation part, and the connecting module of the docking station according to another embodiment.

The above embodiments are based on the fact that the gear set 1822 is realized by a set of spur gears. In practice, the gear set 1822 can be realized by other kind of gear set with complicated structure, but the invention is not limited thereto. Please refer to FIG. 6, which is a schematic diagram illustrating the action mechanism of the support 16, the pivot 142, the transmission device, the rotation part 1824, and the connecting module 184 of the docking station according to another embodiment. In the embodiment, the transmission device is a belt gear 3822, which also can make the pivot 142 and the rotation part 1824 rotate in the same rotation direction. Please refer FIG. 7, which is a schematic diagram illustrating the action mechanism of the support 16, the pivot 142, the transmission device, the rotation part 1824, and the connecting module 184 of the docking station according to another embodiment. In the embodiment, the transmission device is a rack 4822, which also can make the pivot 142 and the rotation part 1824 rotate in the same rotation direction.

It is added that in the above embodiments, if it is required for the pivot 142 and the rotation part 1824 to rotate by different rotation angles, the radii of the first gear portion 1422 and the second gear portion 1824*a* can be different. For example, when the radius of the first gear portion 1422 is smaller than the radius of the second gear portion 1824*a*, the rotation angle of the connector 1842 is smaller than the rotation angle of the support 16. Therefore, even though the support 16 and the connector 1842 are parallel disposed at the accommodated state, after the support 16 rotates to a proper supporting angle, the engagement direction of the connector 1842 is no longer parallel to the support 16 but suitable for the electronic apparatus 2 to be inserted and supported by the support 16, which also performs the effect illustrated in FIG. 5.

Figure 8:
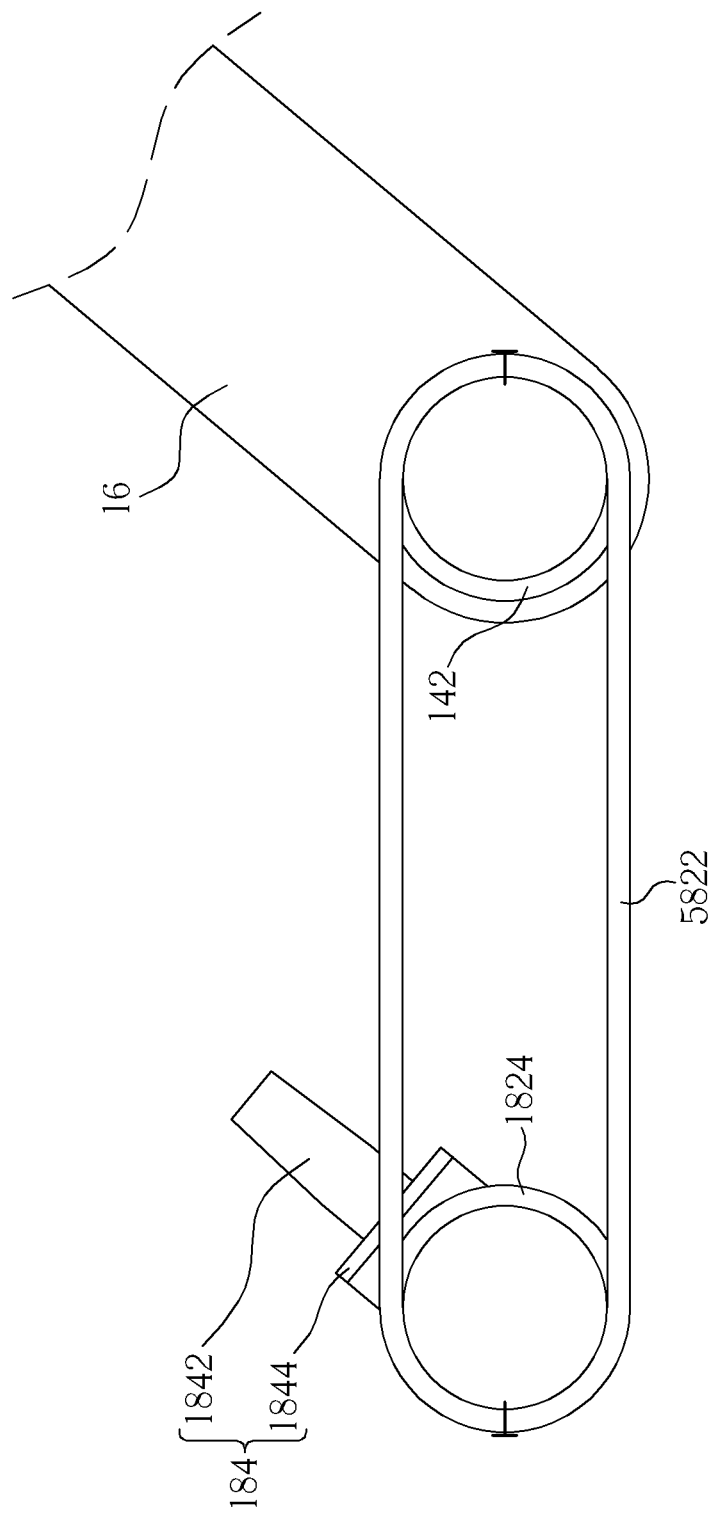
FIG. 8 is a schematic diagram illustrating the action mechanism of the support, the pivot, the circular transmission belt, the rotation part, and the connecting module of the docking station according to another embodiment.

In addition, in the above embodiments, the simultaneous rotation of the pivot 142 and the rotation part 1824 is performed by gear structure, but the invention is not limited thereto. Please refer to FIG. 8, which is a schematic diagram illustrating the action mechanism of the support 16, the pivot 142, the transmission device, the rotation part 1824, and the connecting module 184 of the docking station according to another embodiment. In the embodiment, the transmission device is a circular transmission belt 5822 which is sleeved on the pivot 142 and the rotation part 1824 simultaneously and also can make the pivot 142 and the rotation part 1824 rotate in the same rotation angle. In practice, the circular transmission belt 5822 can be driven by friction force; the circular transmission belt 5822 can be jointed to the pivot 142 and the rotation part 1824 respectively by other fixing methods such as nails (shown by bold lines in the figure) or glue, so as also to perform the transmission effect. Please refer FIG. 9, which is a schematic diagram illustrating the action mechanism of the support 16, the pivot 142, the transmission device, the rotation part 1824, and the connecting module 184 of the docking station according to another embodiment. In the embodiment, the transmission device is a transmission belt 6822, the two end portions of which are wound and fixed on the pivot 142 and the rotation part 1824. The fixing method therefor can be realized by nails (shown by bold lines in the figure) or glue. It is added that in the embodiment, the transmission belt 6822 can only transmit in single direction (indicated by a bold arrow in FIG. 9) in principle. When the support 16 rotates upward, the rotation part 1824 is driven to rotate; when the support 16 rotates downward, the transmission belt 6822 can not drive the rotation part 1824 because of the flexibility of the transmission belt 6822. For such case in practice, an additional torsion spring can be disposed on the rotation part 1824 for resetting the rotation part 1824.

Figure 9:
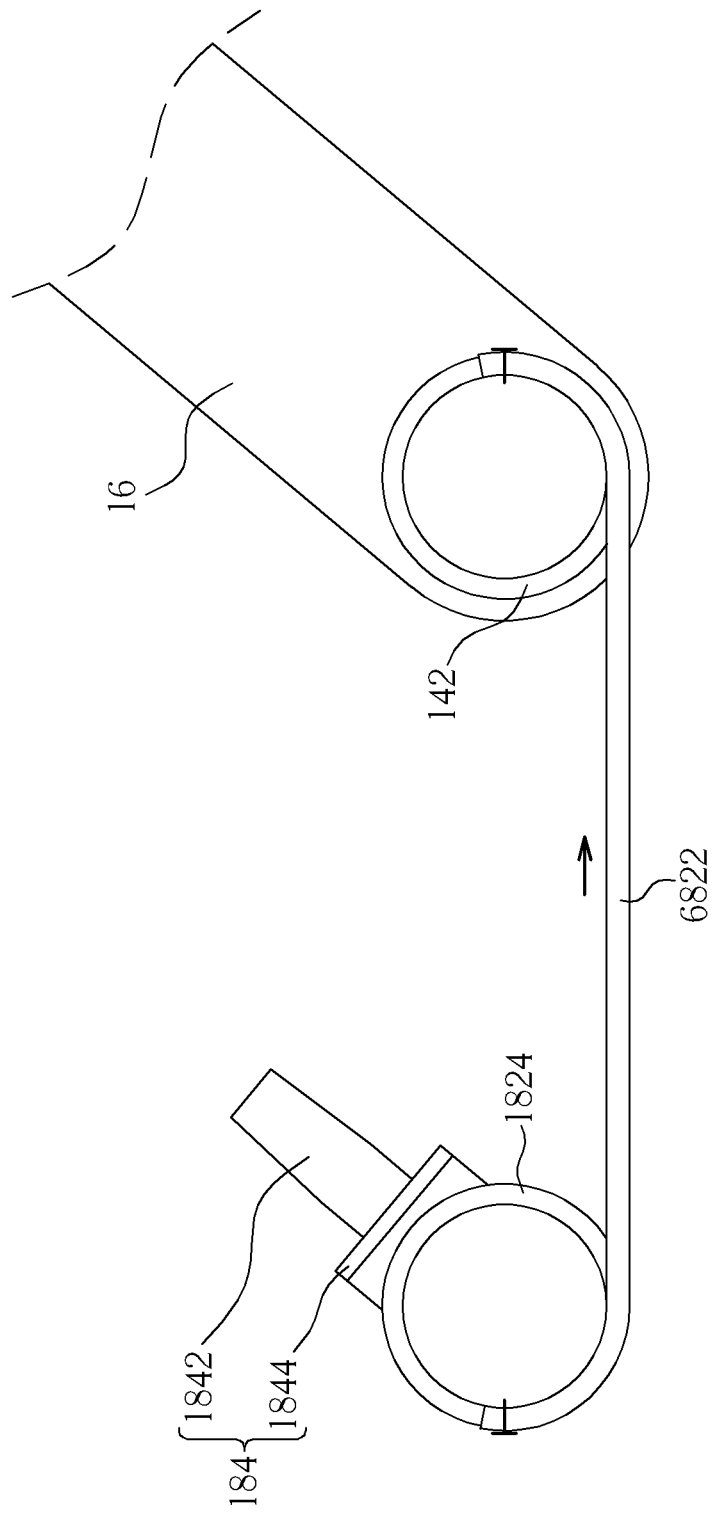
FIG. 9 is a schematic diagram illustrating the action mechanism of the support, the pivot, the transmission belt, the rotation part, and the connecting module of the docking station according to another embodiment.
Figure 10:
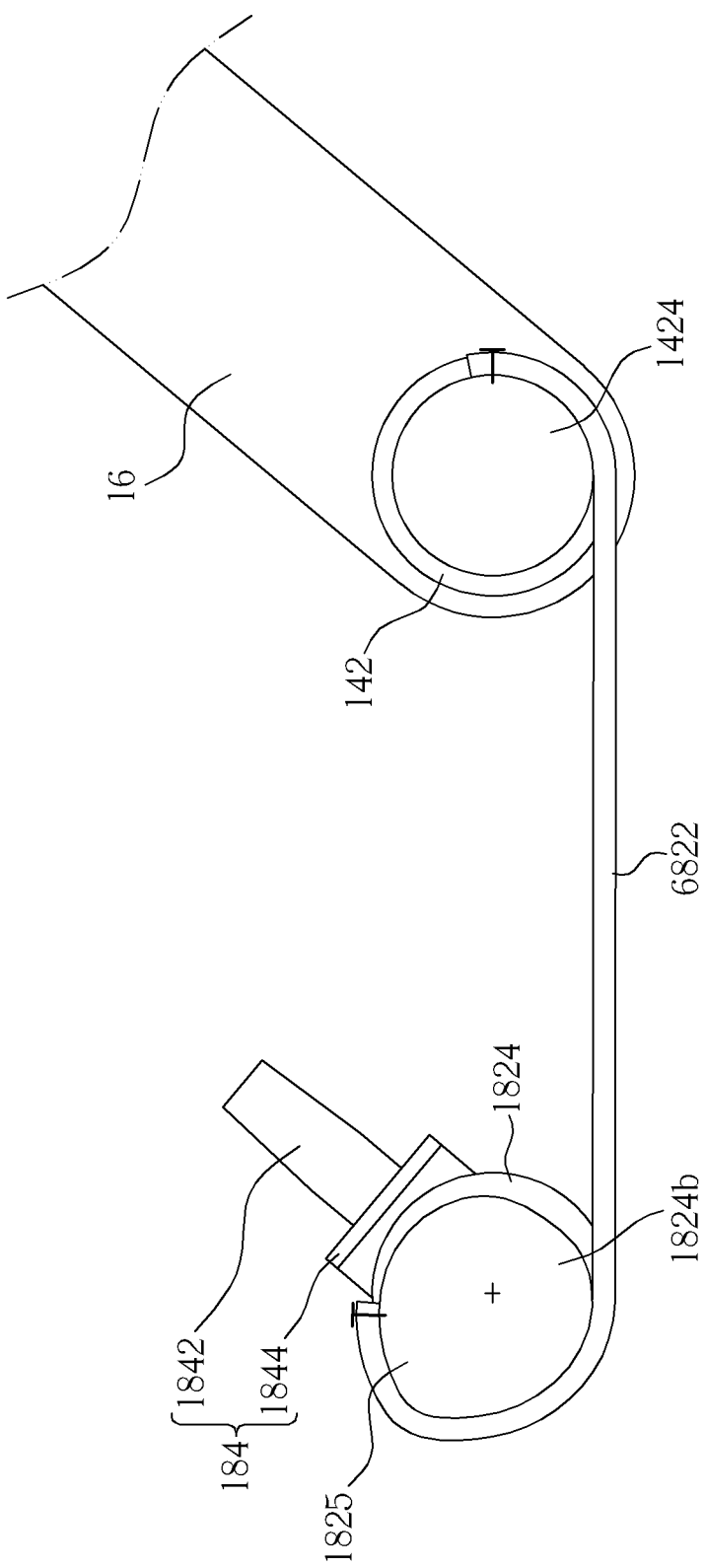
FIG. 10 is a schematic diagram illustrating the action mechanism of the support, the pivot, the transmission belt, the rotation part, and the connecting module of the docking station according to another embodiment.

It is added that in FIG. 9, the portions of the pivot 142 and the rotation part 1824 wound by the transmission belt 6822 are right circles and the radii thereof are the same. Therefore, without consideration for the influence by the thickness of the transmission belt, the pivot 142 and the rotation part 1824 rotate in the same rotation angle, i.e. simultaneously rotate in the same constant angular velocity; however, the invention is not limited thereto. Please refer to FIG. 10, which is a schematic diagram illustrating the action mechanism of the support 16, the pivot 142, the transmission belt 6822, the rotation part 1824, and the connecting module 184 of the docking station according to another embodiment. In the embodiment, the two end portions of the transmission belt 6822 are wound on a first shaft portion 1424 (the position of which is substantially at the first gear portion 1422) of the pivot 142 and a second shaft portion 1824*b* (the position of which is substantially at the second gear portion 1824*a*) of the rotation part 1824 respectively. The cross section of the first shaft portion 1424 is a right circle, while the cross section of the second shaft portion 1824*b* has a cam profile, the rotation center of which is indicated by a cross mark in the figure. By use of the property that the cam profile of the second shaft portion 1824*b* corresponds to different arc length in different angle, the rotation angles of the rotation part 182 and the pivot 142 are different; that is, the pivot 142 and the rotation part 1824 rotate in different angular velocities. By a design on the rotation angle difference, the support 16 and the engagement direction of the connector 1842 are suitable for the electronic apparatus 2 to being engaged and supported within most of the range of the rotation angle (or tilt angle), so as to meet actual requirement of users to the engagement and supporting of the electronic apparatus 2. In principle, as long as the cross sections of the first shaft portion 1424 and the second shaft portion 1824b are different, the rotation angles of the rotation part 1824 and the pivot 142 are different. Therefore, in practice, the cross section of the first shaft portion 1424 can be changed to be with a cam profile, while the cross section of the second shaft portion 1824b is changed to be a right circle. Or the cross sections of the first shaft portion 1424 and the second shaft portion 1824b are designed to be with cam profile.

Figure 11:
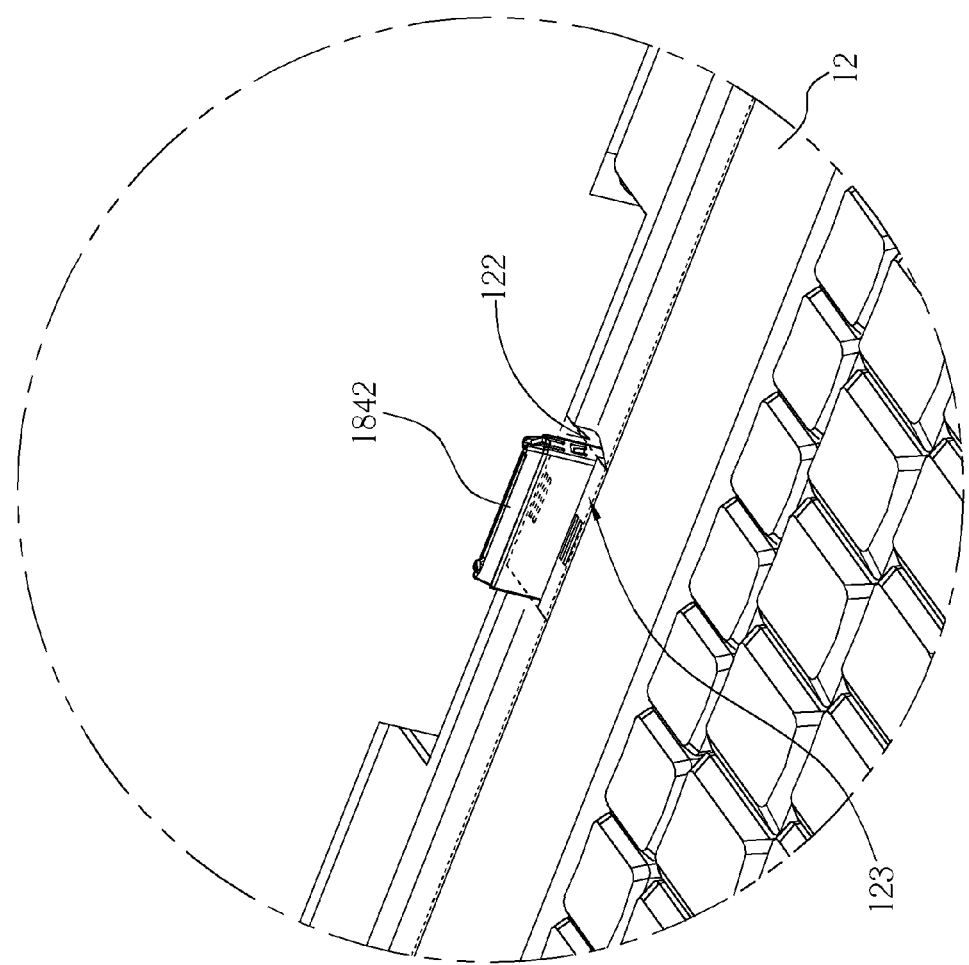
FIG. 11 is an enlarged view of a part of the docking station having a door according to another embodiment.

It is added that in the above embodiments, the connector 1842 is exposed out in the hollow window 122 of the base 12, but the invention is not limited thereto. Please refer to FIG. 11, which is an enlarged view of a part of the docking station 12 having a door 123 according to another embodiment. The door 123 is disposed at the window 122 and capable of being opened to expose the connector 1842. When the connector 1842 rotates downward into the window 122, the door 123 can be closed to cover and hide the connector 1842. In the embodiment, the door 123 is operative by hands, but the invention is not limited thereto. In practice, the door 123 can be opened by pushing of the connector or be closed by resetting effect of a torsion sparing.

As discussed above, the invention uses the angle transmission mechanism to make the connector be capable of rotating as the support of the docking station rotates, so that a user can adjust the supporting angle of the support and the engagement direction of the connector at the same time. The user does not need to additionally adjust the engagement direction of the connector corresponding to the supporting angle of the support, which simplifies the operation of connecting the electronic apparatus onto the docking station by user and also avoids the complicated operation of engaging the docking station with the electronic apparatus in the prior art. Furthermore, the invention can provide various supporting angles for the electronic apparatus by rotational adjusting the tilt angle of the support of the docking station, which solves the problem of the conventional docking station with a fixed connector in the prior art usually capable of providing only one supporting angle and also meets the requirements of various users for operation view on the electronic apparatus engaged with the docking station.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A connector mechanism used in a docking station for electronic apparatus, the docking station comprising a base, a hinge, and a support, the support being pivotally connected to the base through the hinge, the hinge comprising a pivot, the pivot and the support rotating together when the support rotates, the support supporting an electronic apparatus connected to the connector mechanism, the connector mechanism comprising:
    an angle transmission mechanism disposed in the base and comprising a transmission device and a rotation part, the transmission device being connected to the pivot and the rotation part such that when the pivot rotates, the pivot drives the rotation part to rotate through the transmission device; and
    a connecting module fixed on the rotation part and comprising a connector, the connector being exposed out the base at least by request and being electrically connected to the electronic apparatus supported by the support.

2. The connector mechanism of claim 1, wherein the pivot comprises a first gear portion, the rotation part comprises a second gear portion, the transmission device is one selected from the group consisting of a gear set, a belt gear and a rack, and the transmission device meshes with the first gear portion and the second gear portion respectively.

3. The connector mechanism of claim 2, wherein a radius of the first gear portion is smaller than a radius of the second gear portion.

4. The connector mechanism of claim 1, wherein the transmission device is a transmission belt, and two end portions of the transmission belt are wound and fixed on the pivot and the rotation part respectively.

5. The connector mechanism of claim 4, wherein the transmission belt is wound on both a first shaft portion of the pivot and a second shaft portion of the rotation part, and a cross-section of the first shaft portion or the second shaft portion has a cam profile.

6. The connector mechanism of claim 1, wherein the transmission device is a circular transmission belt sleeved on the pivot and the rotation part simultaneously.

7. The connector mechanism of claim 1, wherein the rotation part is a rotary shaft, and the angle transmission mechanism comprises a shaft support fixed on the base to bear the rotary shaft.

8. The connector mechanism of claim 7, wherein the connecting module comprises a circuit board fixed on the rotary shaft, and the connector is fixed on the circuit board.

9. The connector mechanism of claim 1, wherein the pivot and the rotation part are linked by the transmission device so as to rotate simultaneously.

10. The connector mechanism of claim 1, wherein the pivot and the rotation part are linked by the transmission device so as to rotate in different angular velocities.

11. A docking station for electronic apparatus, the docking station comprising:
    a base having a window;
    a hinge comprising a pivot;
    a support pivotally connected to the base through the hinge, the pivot and the support rotating together when the support rotates; and
    a connector mechanism, comprising:
        an angle transmission mechanism disposed in the base and comprising a transmission device and a rotation part, the transmission device being connected to the pivot and the rotation part such that when the pivot rotates, the pivot drives the rotation part to rotate through the transmission device; and
        a connecting module fixed on the rotation part and comprising a connector, the connector being exposed out the base through the window at least by request, wherein when an electronic apparatus is electrically connected to the connector, the support supports the electronic apparatus, and the connector rotates as the support rotates.

12. The docking station of claim 11, wherein the pivot comprises a first gear portion, the rotation part comprises a second gear portion, the transmission device is one selected from the group consisting of a gear set, a belt gear and a rack, and the transmission device meshes with the first gear portion and the second gear portion respectively.

13. The docking station of claim 12, wherein a radius of the first gear portion is smaller than a radius of the second gear portion.

14. The docking station of claim 11, wherein the transmission device is a transmission belt, and two end portions of the transmission belt are wound and fixed on the pivot and the rotation part respectively.

15. The docking station of claim 14, wherein the transmission belt is wound on both a first shaft portion of the pivot and a second shaft portion of the rotation part, and a cross-section of the first shaft portion or the second shaft portion has a cam profile.

16. The docking station of claim 11, wherein the transmission device is a circular transmission belt sleeved on the pivot and the rotation part simultaneously.

17. The docking station of claim 11, wherein the rotation part is a rotary shaft, and the angle transmission mechanism comprises a shaft support fixed on the base to bear the rotary shaft.

18. The docking station of claim 17, wherein the connecting module comprises a circuit board fixed on the rotary shaft, and the connector is fixed on the circuit board.

19. The docking station of claim 11, wherein the base has a groove structure, the connector is exposed out the groove structure, and when the electronic apparatus is electrically connected to the connector, the groove structure contains an edge of the electronic apparatus.

20. The docking station of claim 11, wherein the base thereon defines a manipulation plane, the base comprises a manipulation input module, and the connector and the manipulation input module are exposed out the manipulation plane.

21. The docking station of claim 11, wherein the pivot and the rotation part are linked by the transmission device so as to rotate simultaneously.

22. The docking station of claim 11, wherein the pivot and the rotation part are linked by the transmission device so as to rotate in different angular velocities.

23. The docking station of claim 11, wherein the base comprises a door at the window, and the door is selectively opened to expose the connector or being closed to cover the connector.

\* \* \* \* \*